US009860272B2

(12) United States Patent
Yablokov (10) Patent No.: US 9,860,272 B2
(45) Date of Patent: *Jan. 2, 2018

(54) SYSTEM AND METHOD FOR DETECTION OF TARGETED ATTACK BASED ON INFORMATION FROM MULTIPLE SOURCES

(71) Applicant: AO Kaspersky Lab, Moscow (RU)

(72) Inventor: Victor V. Yablokov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,636

(22) Filed: May 26, 2016

(65) Prior Publication Data

US 2016/0277442 A1  Sep. 22, 2016

Related U.S. Application Data

(63) Continuation of application No. 14/484,891, filed on Sep. 12, 2014, now Pat. No. 9,386,031.

(51) Int. Cl.
*G06F 11/00* (2006.01)
*H04L 29/06* (2006.01)

(52) U.S. Cl.
CPC ...... *H04L 63/1466* (2013.01); *H04L 63/1416* (2013.01); *H04L 63/1425* (2013.01)

(58) Field of Classification Search
CPC .................................................. H04L 63/1416
USPC ......................................................... 726/22
See application file for complete search history.

(56) References Cited

U.S. PATENT DOCUMENTS

| 8,418,247 B2 | 4/2013 | Sinnaya et al. |
| 2004/0111632 A1 | 6/2004 | Halperin |
| 2010/0082513 A1* | 4/2010 | Liu ..................... H04L 63/1458 706/46 |
| 2010/0138925 A1* | 6/2010 | Barai .................. H04L 63/1433 726/25 |

(Continued)

OTHER PUBLICATIONS

Tom Olzak, DNS Cache Poisoning: Definition and Prevention, Mar. 2006  adventuresinsecurity.com/Papers/DNS_Cache_Poisoning.pdf.

*Primary Examiner* — Mohammad W Reza
(74) *Attorney, Agent, or Firm* — Arent Fox LLP; Michael Fainberg (57) ABSTRACT

Disclosed are methods, systems, and computer programs for detecting targeted attacks on compromised computer from multiple sources. An example method includes obtaining data from multiple computer systems and devices connected with one another in a communications network to determine a possibility of a targeted attack from a network resource, the data comprising information relating to the network resource and a set of parameters of each computer system or device in accessing the network resource; detecting discrepancies in the obtained data; forming and sending queries to a group of computer systems and devices detecting the possibility of the targeted attack with the set of parameters of the group of computer systems and devices in accessing the network resource; and calculating a probability of the targeted attack from the network resource based at least upon information received from the group of computer systems and devices in response to the queries.

20 Claims, 5 Drawing Sheets

(56) References Cited

U.S. PATENT DOCUMENTS

| | | | |
|---|---|---|---|
| 2012/0250658 A1* | 10/2012 | Eisl | H04L 63/1458 370/331 |
| 2012/0278890 A1* | 11/2012 | Maatta | H04L 63/1425 726/23 |
| 2014/0143870 A1 | 5/2014 | Goldman et al. | |
| 2015/0096018 A1 | 4/2015 | Mircescu | |

* cited by examiner

Fig. 1A

| Resource's Domain Name | Resource's IP Address |
|---|---|
| *.yandex.ru | 173.195.38.119 |
| *.vk.com | 65.13.28.44 |
| *.sberbank.ru | Hacker's IP Address |
| ... | ... |

Fig. 4

SYSTEM AND METHOD FOR DETECTION OF TARGETED ATTACK BASED ON INFORMATION FROM MULTIPLE SOURCES

CROSS-REFERENCE TO RELATED APPLICATIONS

This application is a continuation of U.S. application Ser. No. 14/484,891, filed Sep. 12, 2014 which is incorporated by reference herein.

FIELD OF TECHNOLOGY

The present disclosure relates generally to the field of computer security, and, more specifically, to systems and methods for identifying targeted attacks on computer systems from multiple sources.

BACKGROUND

At present, more and more interactions are taking place through the Internet. For most people today it is not a problem to send or receive email, use the services of a web resource (hereinafter, resource), such as accessing one or several files, documents, images, sounds, videos, computers, servers, services, web pages, etc., or make a purchase at an Internet store. Due to the ever increasing amount of confidential user data ending up on the Internet, the problem of its theft is becoming increasingly acute. In most cases, for the theft of user data, the hacker tries to install malicious software on the computer systems of users. However, when this is not possible for whatever reasons, the user may be subjected to an attack in the process of the user's system interacting with a resource. One popular method in this case is a man-in-the-middle attack—a method of compromising a communications channel in which the hacker connects to the channel between contracting parties and interferes in the transmission protocol, reading, removing, or distorting information. Such attacks can be very effective and rather hard to detect. The target of such attacks may be either a specific user system or a group of user systems.

There are several effective means of defense against man-in-the-middle attacks, but nearly all of them are employed either in the router itself, to which the user being attacked is connected, or on servers which the potential victim is visiting. The users does not know whether they are on the genuine server or whether it is a fake substituted by the hacker. One of the ways of defending against such an attack is the use of strong encryption between client and server. In this case, the server can identify itself by presenting a digital certificate, after which an encrypted channel is established between the user and the server for the exchange of confidential data. But in this case there is a dependence on the server itself and its chosen method of encryption. Another type of defending against certain kinds of such attacks might be a total refusal to use open Wi-Fi networks for working with personal data.

Thus, there is a need to create effective technologies for identifying targeted attacks of the man-in-the-middle type which can prevent the stealing of user data without imposing restrictions on the user's working on the Internet.

SUMMARY

Disclosed are methods, systems and computer programs for detecting targeted attacks on compromised computer from multiple sources. An example method includes obtaining, by a processor of a computing device, data from multiple computer systems and devices connected with one another in a communications network to determine a possibility of a targeted attack from the network resource, the data comprising information relating to the network resource and a set of parameters of each computer system or device in accessing the network resource; detecting discrepancies in the obtained data relating to the possibility of the targeted attack from the network resource from the multiple computer systems and devices; forming and sending queries, by the processor, to a group of computer systems and devices detecting the possibility of the targeted attack with the set of parameters of the group of computer systems and devices in accessing the network resource; and calculating a probability of the targeted attack from the network resource based at least upon information received from the group of computer systems and devices in response to the queries.

In one exemplary aspect, the multiple computer systems and devices comprise at least one of: user computer systems; trusted domain name resolution services; Internet service providers; and search systems.

In one exemplary aspect, the data comprise at least one of: parameters of resolving responses from domain name resolution services containing information about a queried domain; a DNS cache time to live (TTL); an IP address; a destination URL address; a public key certificate; and a file.

In one exemplary aspect, the set of parameters of each computer system or device in accessing the network resource comprises information relating to at least one of: an operating system; a communication method; an Internet service provider; a mobile operator; a client application; and a geographic region.

In one exemplary aspect, the detecting discrepancies in the obtained data comprises detecting at least one of: a previously unknown IP address for a known resource; a negative change of security rating of a resource; a change of a DNS server and/or of an Internet provider for a known resource; and differences in the information obtained from a known resource through different sources.

In one exemplary aspect, the method further comprises identifying at least one common parameter among the set of parameters of each of the group of computer systems and devices in accessing the network resource.

In one exemplary aspect, the method further comprises comparing the probability of the targeted attack against a selected threshold value.

An exemplary system for detecting targeted attacks on compromised computer from multiple sources comprises :a processor of a computing device configured to: obtain data from multiple computer systems and devices connected with one another in a communications network to determine a possibility of a targeted attack from the network resource, the data comprising information relating to the network resource and a set of parameters of each computer system or device in accessing the network resource; detect discrepancies in the obtained data relating to the possibility of the targeted attack from the network resource from the multiple computer systems and devices; form and send queries to a group of computer systems and devices detecting the possibility of the targeted attack with the set of parameters of the group of computer systems and devices in accessing the network resource; and calculate a probability of the targeted attack from the network resource based at least upon information received from the group of computer systems and devices in response to the queries.

An exemplary non-transitory computer-readable storage medium comprising computer-executable instructions for detecting targeted attacks on compromised computer from multiple sources, including instructions for: obtaining data from multiple computer systems and devices connected with one another in a communications network to determine a possibility of a targeted attack from the network resource, the data comprising information relating to the network resource and a set of parameters of each computer system or device in accessing the network resource; detecting discrepancies in the obtained data relating to the possibility of the targeted attack from the network resource from the multiple computer systems and devices; forming and sending queries to a group of computer systems and devices detecting the possibility of the targeted attack with the set of parameters of the group of computer systems and devices in accessing the network resource; and calculating a probability of the targeted attack from the network resource based at least upon information received from the group of computer systems and devices in response to the queries.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for detection of targeted attacks on compromised computer systems. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The described technology can be used to verify data in regard to its modification and to identify targeted attacks. For example, a device working under the control of an operating system X, with application Y (such as a browser for access to resources), with SIM card Z, situated in region C, upon accessing a resource R by using a communication method M (Wi-Fi 3G), receives a certain reply from the resource (a destination URL address, an IP address, a public key certificate, or a file). In this process, somewhere between the device and the resource R the content of the reply is altered by a hacker. Such an alteration may occur depending on the device's region C, the operator Z, the communication method M, and the application Y. To identify the method and point of the attack, and also the range of its effect (the devices coming under attack), the system for detection of targeted attacks obtains access to this resource using various parameters X, Y, Z, M, C, and so on. The list of parameters can be much broader. The sample list of varying parameters is provided only for a clear demonstration. The system for detection of targeted attacks obtains access to the resource from different devices, operating systems, regions, operators, and subnetworks. The expert system itself need not obtain this access but can merely collect information from different devices connected to it. The collected information is analyzed and a probabilistic verdict is made as to the presence of an attack, its location, and extent (possible number of user systems coming under attack). A particular instance of the symptoms of an attack is mismatching certificates obtained by two identical devices (in terms of parameters X, etc.) situated at different geographic locations.

Figure 1A:
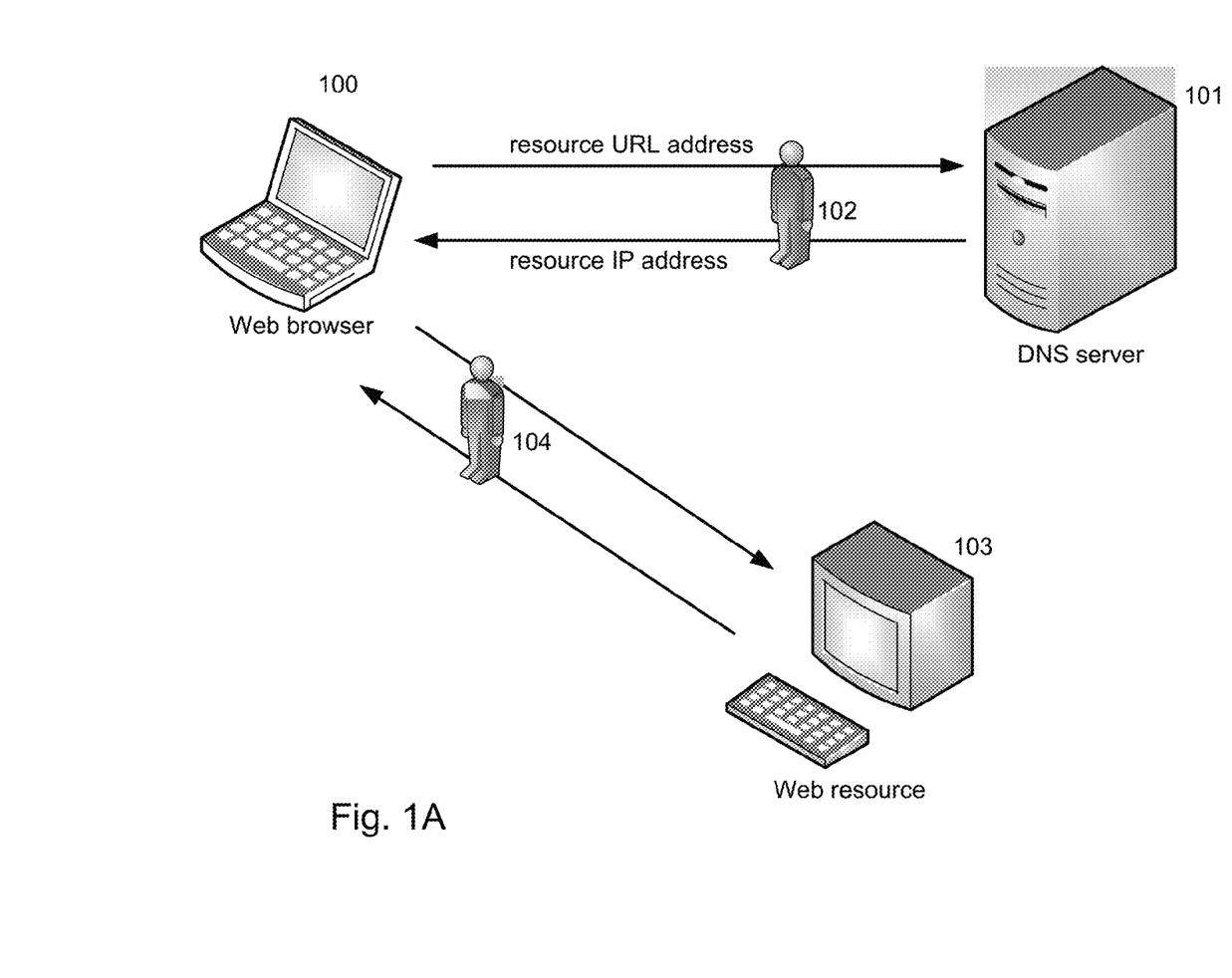
FIG. 1A illustrates a block diagram of an example interaction of a user computer system with a network resource.

FIG. 1A illustrates example interaction of a user with a network resource. In the first step, the user enters a URL address in the address line of a web browser 100. Since the routing in contemporary networks normally performed using IP protocol, it is necessary for the web browser 100 to determine the IP address for the required resource. The domain name resolution service or Domain Name System (DNS)—usually a DNS server 101 with a table of correspondence of domain name and IP address—is used for this purpose. The name resolution table may in part be kept locally on the user's computer; for example, it may contain a set of URL and IP address pairs for the web sites visited most often (as a hosts file or as a DNS cache in browsers). If there is no local record, a domain name resolution query can be dispatched to the DNS server 101 which is located remotely, for example, in a global or local-area network. Then, after obtaining the IP address for the requested site, the web browser 100 can send a request to establish a connection. In this specification, a URL address and a domain name are used interchangeably.

The parties to the interaction (the resource and the user) would often have to perform an authentication. In modern systems, public key certificates are used for authentication of resources, which, on the one hand, can confirm the authenticity of the certificate's owner and, on the other hand, are involved in establishing secure transmission of data via public communications channels.

Upon receiving the request to establish a connection, the resource 103 sends back its public key certificate containing information about the owner of that certificate, such as their contact data, company name, and URL address.

After the authentication, or when it is not required, the data exchange between the web browser 100 and the resource 103 commences. In this exchange, the user can send requests, receiving various kinds of data in reply.

Since this typical interaction between a user (via the web browser 100) and a resource involves several intermediaries (such as DNS servers, routers, etc.), a hacker might compromise the communication channel using any of the intermediaries. Thus, in modern systems one can never be sure that a connection is established with the actual resource requested by the user. The following factors at least might be the reason for this:

a hacker has compromised the communication channel 102 between the user and the DNS server 101, so that when the URL address of the requested web site is indicated in the web browser 100, the routing of the entire traffic goes to the hacker's IP address. An example of compromising the domain name resolution table is shown schematically in FIG. 1B;

a hacker has compromised the communication channel 104 between the user and the resource 103 by an unsanctioned alteration of the routing table on the user's computer or on one of the routers so that the entire traffic goes through a hacker's system, by changing one of the default routes, indicating a hacker's IP address as the next router, and also by adding a new entry to the routing table or by changing the old one only for a particular web site. Thus, the hacker is able to read and modify the incoming and outgoing data packets.

Since the use of the existing mechanisms does not allow determining the entity with which the user communicates or interacts, when there are active efforts on the part of a hacker, one needs a system and a method for identification of targeted attacks, which are described below.

Figure 1B:
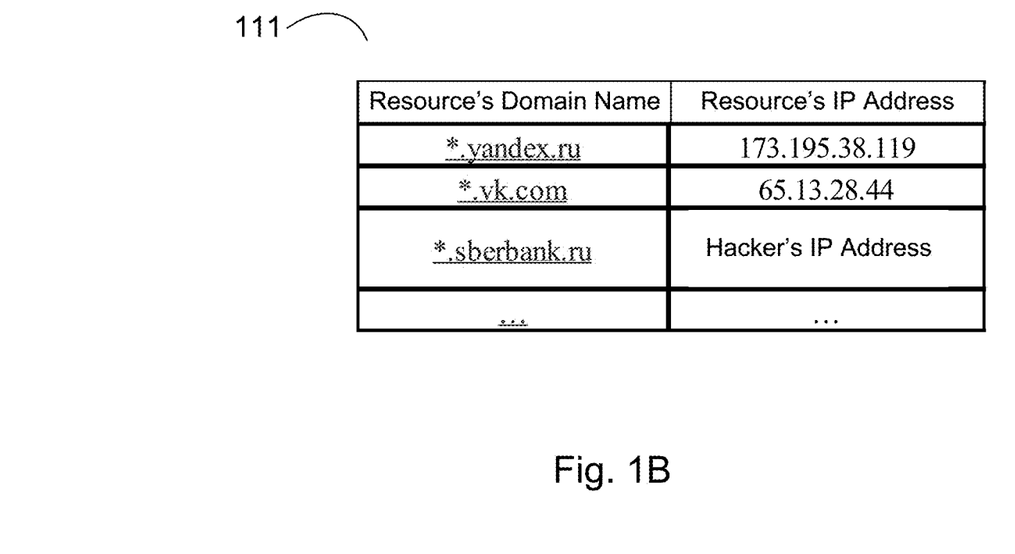
FIG. 1B illustrates an example portion of a domain name resolution table according to one aspect of the present disclosure.

FIG. 1B illustrates in simplified form an example of a portion of a domain name resolution table 111. The table 111 shows the correspondence between a domain name and an IP address. For example, IP addresses are shown for the domains yandex.ru and vk.com. It also shows the changes made by a hacker, in particular, with regard to the domain sberbank.ru. Thus, when the resolution table 111 is used, the entire traffic intended for the web site www.sberbank.ru is rerouted to the IP address of the hacker. It should be noted that hackers at present are using this scheme because some DNS servers cache data from other DNS servers, one of which might be, for example, a hacker's DNS server. DNS servers cache the data to speed up processing of subsequent queries. When a DNS client makes a domain name query, which is already familiar to the server, the resolution process goes faster when caching is used. If the DNS server has cached a reply, positive or negative, the reply is simply returned to the client. However, DNS servers cannot cache data forever, or else changes on authoritative servers would never be distributed throughout the net, and the remote servers would simply continue to use the cached information. Therefore, the administrator of the DNS zone containing the data usually determines the lifetime of this data (the time to live, TTL). Hackers can also make unsanctioned changes to the local name resolution table on a user's computer, for example, in the hosts file. Information from this file has priority over the data received from remote DNS servers. In this specification, we will consider the above examples of compromised communication channels to be man-in-the-middle type attacks.

Figure 2:
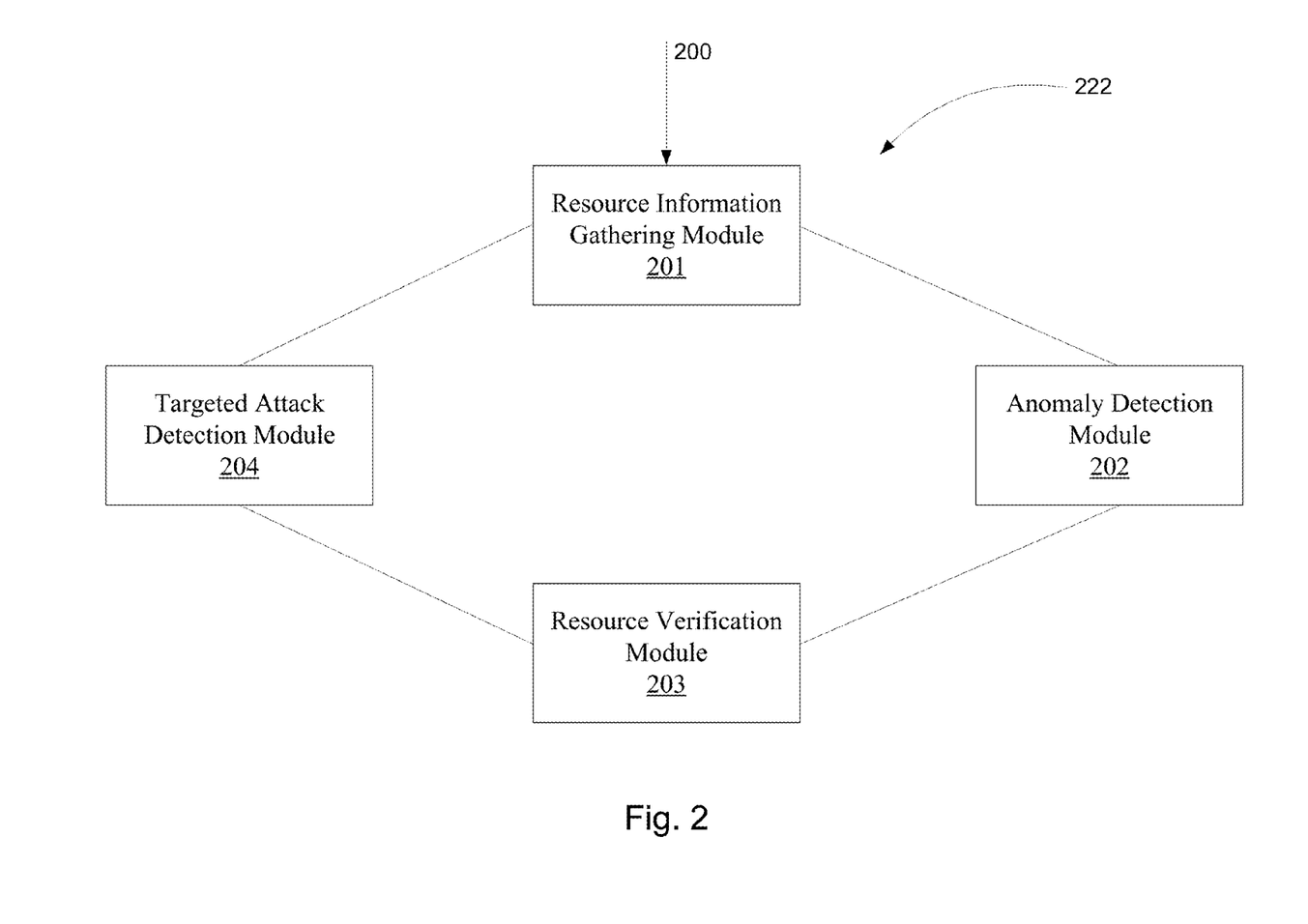
FIG. 2 illustrates a detailed block diagram of an example system for detection of targeted attacks according to one aspect of the present disclosure.

FIG. 2 illustrates an example system for detecting and preventing targeted attacks 222, such as man-in-the-middle attacks. The system 222 can be implemented using one or more general-purpose computers, such as, for example, shown in FIG. 4. Without limiting generality, one or more components of the system 222 can also function on any computing device, including personal computers, servers, or mobile devices.

The system 222 includes a resource information collecting module collecting information about resources 201 connected to an anomaly detection module 202 and also to a targeted attack detection module 204. The information collecting module 201 receives information on the resources from at least the following sources 200:

from user computer systems;
from trusted domain name resolution services;
from Internet providers; and
from search systems.

The received information may include at least the following data:

resolving responses from DNS servers containing information about queried domains (including an IP address, TTL, and other standard parameters transmitted in messages from the DNS servers);
a destination URL address;
a file; and
a public key certificate.

The information collecting module 201 accumulates the data obtained from the various sources to provide input for analysis by the anomaly detection module 202 and for analysis by the targeted attack detection module 204.

The anomaly detection module 202 identifies discrepancies in the data received from the resources or other suspect indicators in the information received from or in regard to the resource. Various approaches known from the prior art can be used to identify such indicators in the received information related to a resource, such as set rules for determining suspicious data, for example: "if a new IP address appears in the database for an existing URL address, while the previously known IP address corresponding to the URL address is still valid (that is, the resource can be accessed with it), the new IP address is suspicious". At least the following are examples of suspect indicators:

appearance of a previously unknown IP address for a known resource;
negative change in the security rating of a resource;
change of the DNS server and/or Internet provider for a known resource; and
differences in the information obtained from a known resource in the context of one or more sources.

It is also possible to use self-teaching algorithms for finding suspect indicators, such as adaptive algorithms with feedback, as well as neural networks whose inputs are the data accumulated by the information collecting module 201 related to and received from known resources, such as URL addresses, IP addresses, any parameters of the received data, files, or public key certificates and their key parameters, and so on. Only preliminary determination of resources for which further verifications will be needed is done at this stage.

After detection of suspect indicators or discrepancies in the information related to a resource, the resource verification module 203 performs additional actions involving forming and sending additional queries from computer systems with various parameters to the resource for which the suspect indicators are detected. In other words, at this stage, the system accesses the investigated resource by imitating or using trusted computer systems with various parameters. This way, statistical data are collected to establish correlation between the parameters of a computer system and the received information related to the investigated resource. At least the following parameters can be the varied parameters of the computer systems requesting information in related to the investigated resource:
- the operating system;
- the communication method;
- the service provider or mobile operator;
- the client application, such as the browser from which the resource is being accessed; and
- the geographic region from which the resource is accessed.

The parameters are varied at least until at least one parameter or set of parameters is identified that is common to the computer systems for which presence of the suspect indicator is confirmed. For systems where this parameter or set of parameters is different, this suspect indicator may be absent. For example, if for computer systems with an Android operating system that are accessing the investigated resource via a public Wi-Fi point via Opera Mobile ver. X client application the IP address of the resource returned by a DNS server differs from the IP address obtained by computer systems with a different set of values of these parameters, one may assume existence of a vulnerability in this client application and/or a compromised Wi-Fi router rerouting the user to an address set by a hacker.

After detecting suspect indicators with the anomaly detection module 202 and collecting of additional information by the resource verification module 203, the obtained data are evaluated by the targeted attack detection module 204. A decision regarding presence of a targeted attack can be made with any known methodologies, such as analysis of accumulated statistics reflecting information on the likelihood of a man-in-the-middle attack, or from the identified set of parameters common to the computer systems for which the suspect indicator is confirmed. For example, if a suspicious IP address was previously used in the context of some malicious activity, the probability of a man-in-the-middle attack is equal to or close to 1. In some aspects, this information is kept in a list or a table listing the detected indicators and the corresponding attack probabilities, where the indicators are identified by the anomaly detection module 202, and the parameters common to the computer systems for which the suspect indicator is confirmed are identified.

The probability value in this list may change depending on the feedback received. If it is discovered that an indicator or an indicator change in the majority of cases is not a result of a man-in-the-middle attack, or that a legitimate event caused an indicator to appear in combination with certain parameters of computer systems delimiting the presence of the indicator, then the probability of an attack when this indicator is present or this indicator changes may be reduced. When several suspect indicators or suspect changes of indicators are detected, the probability of an attack for the investigated resource is calculated as a function of the probabilities of an attack for all indicators and for the sets of parameters corresponding to these indicators; for example, this function may be the maximum probability of an attack over all the detected indicators. Weighting factors may be used to calculate the probability of an attack, depending on the quantity and/or the combination of suspect indicators and the corresponding sets of parameters for which discrepancies were found. The decision regarding the presence of a targeted attack is made when the probability of an attack for a particular resource is greater than a predetermined threshold value.

Figure 3:
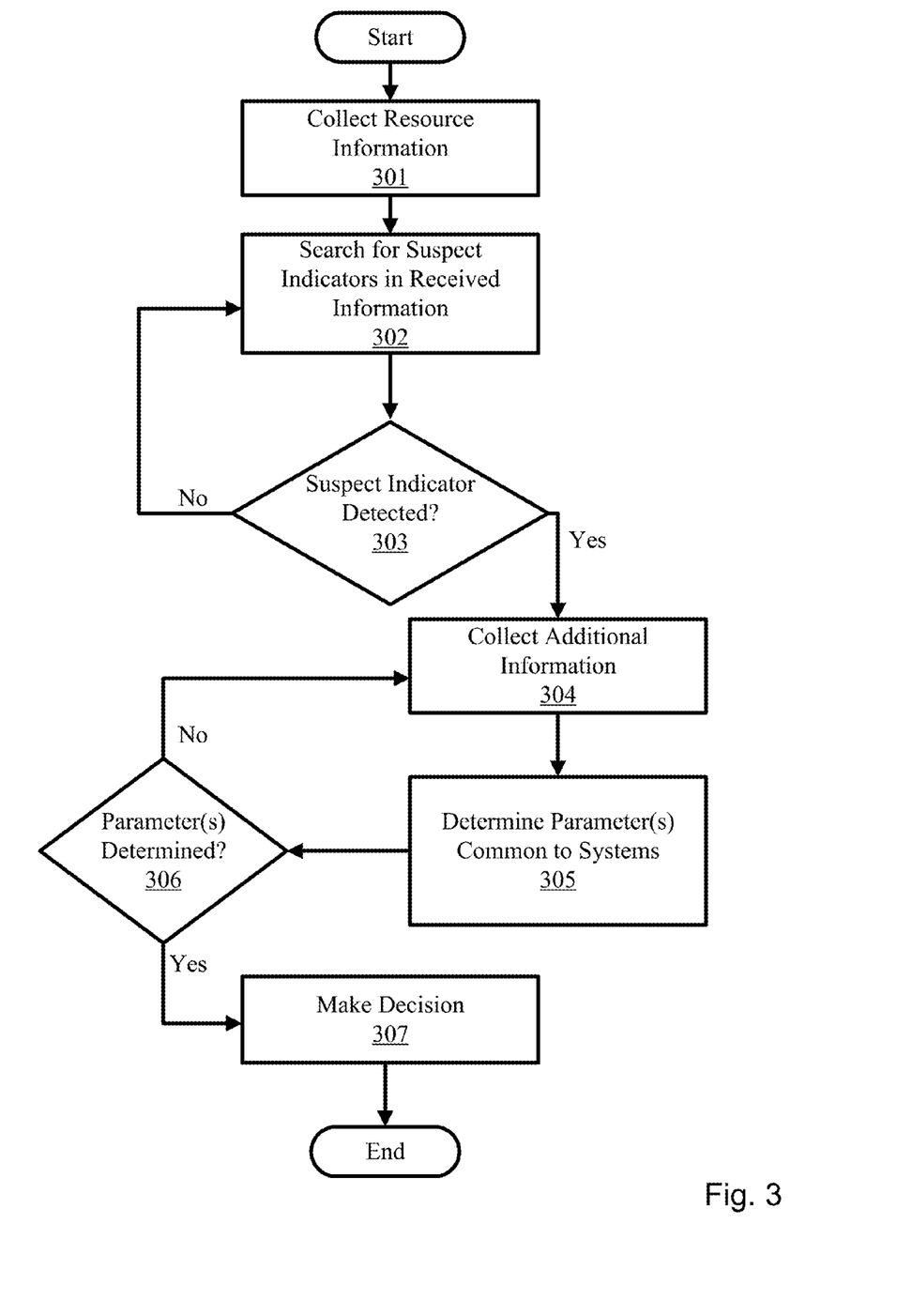
FIG. 3 illustrates a block diagram of an example method for detection of targeted attacks according to one aspect of the present disclosure.

FIG. 3 illustrates a method of detecting targeted attacks using the system 222. In this method, during the first step 301, information is collected about the resources from different sources, which can be user computer systems on which, for example, Kaspersky Laboratory antivirus software has been installed; these sources can also be trusted servers including trusted domain name resolution services; Internet providers or search systems can also be used as sources.

For example, an Internet provider or a search system upon detecting a new resource can notify the resource information collecting module 201 about it.

The information collected from the different sources about the resources may include resolving responses from DNS servers containing information about the requested domain, which contains the IP address, the TTL, and other standard parameters transmitted in messages from DNS servers, as well as any data returned to the user upon interacting with resources, such as URL addresses, files, or public key certificates.

In step 302 the collected information is analyzed by the anomaly detection module 202. The anomaly detection process may be performed whenever the information collected by the collect resource information collecting module 201 is updated.

If the anomaly detection module 202 detects a suspect indicator in step 303, the information about it and the respective resource is sent to the resource verification module 203 for collecting additional information 304. The resource verification module 203 accesses the resource being investigated by imitating or using trusted computer systems with various parameters. The varying parameters of the computer systems requesting information from and about the investigated resource could be the installed operating systems, the applications being used, the communication method being used, the network service providers or mobile operators being used, or the geographic region from which the resource is being accessed.

In one aspect, in step 305 the parameters are varied at least until there is a determination in step 306 of at least one parameter or set of parameters common to the computer systems for which the presence of a suspect indicator is confirmed. For systems where this parameter or set of parameters is different, this suspect indicator may be absent.

On the basis of the at least one detected suspect indicator and the at least one determined parameter common to the computer systems for which the presence of a suspect indicator is confirmed, the targeted attack detection module 204 makes a decision, in step 307, as to the presence of a targeted attack.

The making of the decision as to the presence of a targeted attack can be done using any known methodologies as described above in relation to FIG. 3.

Figure 4:
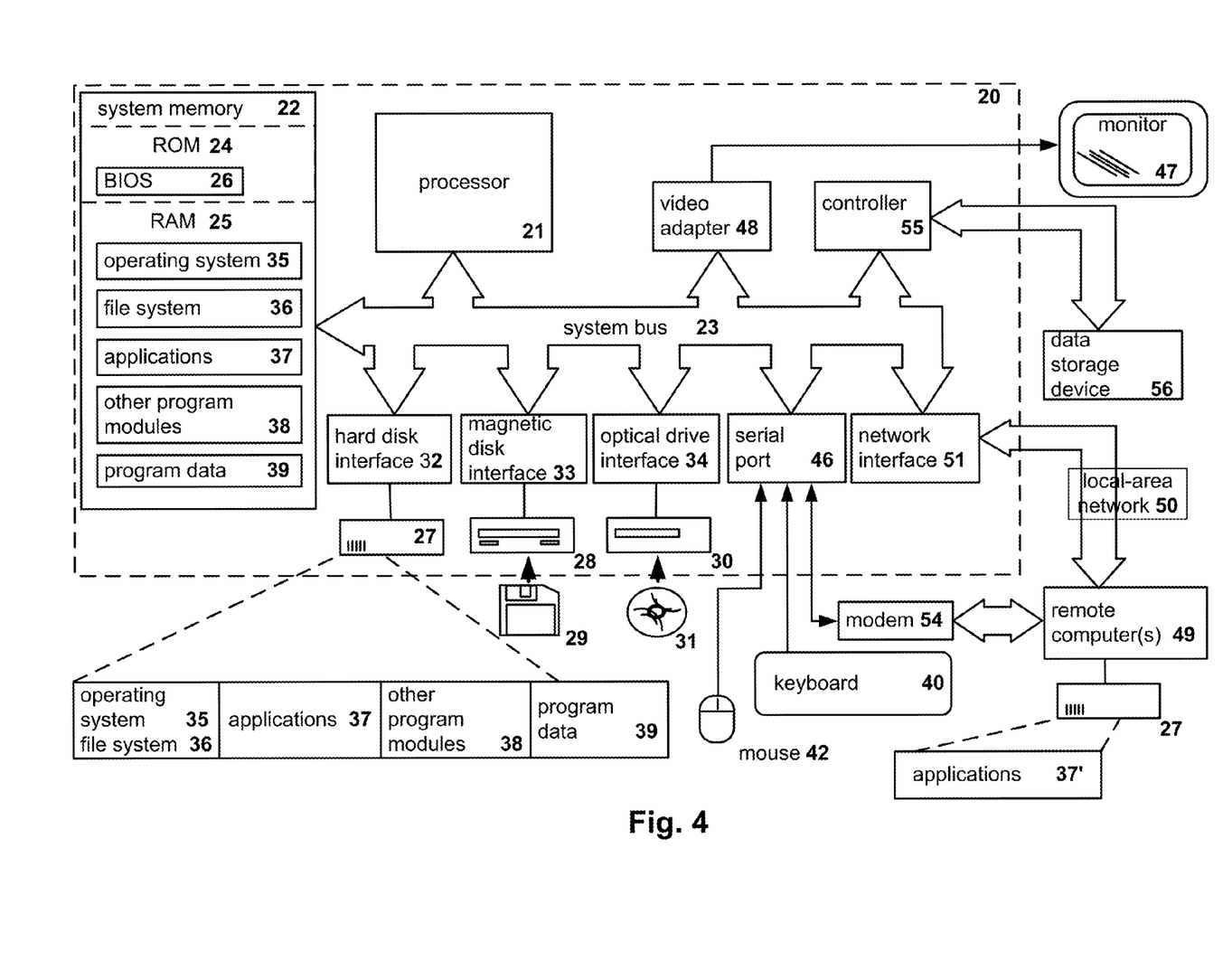
FIG. 4 illustrates an example of a general-purpose computer system, such as a personal computer or a server, suitable for implementing the disclosed aspects of systems and method for detection of targeted attacks according one aspect of the present disclosure.

FIG. 4 shows an example of a general-purpose computer system (which may be a personal computer or a server) 20, which may be used to implement system and methods for detection of targeted attacks disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting targeted attacks from a network resource, comprising:
obtaining, by a processor of a computing device, data from multiple computer systems and devices connected with one another in a communications network to determine a possibility of a targeted attack from the network resource, the data comprising information relating to the network resource and a set of parameters of each computer system or device in accessing the network resource;

detecting discrepancies in the obtained data relating to the possibility of the targeted attack from the network resource from the multiple computer systems and devices;

forming and sending queries, by the processor, to a group of computer systems and devices detecting the possibility of the targeted attack with the set of parameters of the group of computer systems and devices in accessing the network resource, wherein the parameters are varied at least until one parameter or set of parameters is identified that is common to the computer systems in the group for which presence of the discrepancy is confirmed; and calculating a probability of the targeted attack from the network resource based at least upon information received from the group of computer systems and devices in response to the queries.

2. The method of claim 1, wherein the multiple computer systems and devices comprise at least one of: user computer systems; trusted domain name resolution services; Internet service providers; and search systems.

3. The method of claim 1, wherein the data comprise at least one of:
parameters of resolving responses from domain name resolution services containing information about a queried domain;
a DNS cache time to live (TTL);
an IP address;
a destination URL address;
a public key certificate; and
a file.

4. The method of claim 1, wherein the set of parameters of each computer system or device in accessing the network resource comprises information relating to at least one of: an operating system; a communication method; an Internet service provider; a mobile operator; a client application; and a geographic region.

5. The method of claim 1, wherein the detecting discrepancies in the obtained data comprises detecting at least one of:
a previously unknown IP address for a known resource;
a negative change of security rating of a resource;
a change of a DNS server and/or of an Internet provider for a known resource; and
differences in the information obtained from a known resource through different sources.

6. The method of claim 1, further comprising identifying at least one common parameter among the set of parameters of each of the group of computer systems and devices in accessing the network resource.

7. The method of claim 1, further comprising comparing the probability of the targeted attack against a selected threshold value.

8. A system for detecting targeted attacks from a network resource, comprising:
a hardware processor configured to: obtain data from multiple computer systems and devices connected with one another in a communications network to determine a possibility of a targeted attack from the network resource, the data comprising information relating to the network resource and a set of parameters of each computer system or device in accessing the network resource;

detect discrepancies in the obtained data relating to the possibility of the targeted attack from the network resource from the multiple computer systems and devices;

form and send queries to a group of computer systems and devices detecting the possibility of the targeted attack with the set of parameters of the group of computer systems and devices in accessing the network resource, wherein the parameters are varied at least until one parameter or set of parameters is identified that is common to the computer systems in the group for which presence of the discrepancy is confirmed; and calculate a probability of the targeted attack from the network resource based at least upon information received from the group of computer systems and devices in response to the queries.

9. The system of claim 8, wherein the multiple computer systems and devices comprise at least one of: user computer systems; trusted domain name resolution services; Internet service providers; and search systems.

10. The system of claim 8, wherein the data comprise at least one of:
parameters of resolving responses from domain name resolution services containing information about a queried domain;
a DNS cache time to live (TTL);
an IP address;
a destination URL address;
a public key certificate; and
a file.

11. The system of claim 8, wherein the set of parameters of each computer system or device in accessing the network resource comprises information relating to at least one of: an operating system; a communication method; an Internet service provider; a mobile operator; a client application; and a geographic region.

12. The system of claim 8, wherein the detecting discrepancies in the obtained data comprises detecting at least one of:
a previously unknown IP address for a known resource;
a negative change of security rating of a resource;
a change of a DNS server and/or of an Internet provider for a known resource; and
differences in the information obtained from a known resource through different sources.

13. The system of claim 8, wherein the processor is further configured to identify at least one common parameter among the set of parameters of each of the group of computer systems and devices in accessing the network resource.

14. The system of claim 8, wherein the processor is further configured to compare the probability of the targeted attack against a selected threshold value.

15. A non-transitory computer-readable storage medium comprising computer-executable instructions for detecting targeted attacks from a network resource, including instructions for:
obtaining data from multiple computer systems and devices connected with one another in a communications network to determine a possibility of a targeted attack from the network resource, the data comprising information relating to the network resource and a set of parameters of each computer system or device in accessing the network resource;

detecting discrepancies in the obtained data relating to the possibility of the targeted attack from the network resource from the multiple computer systems and devices;

forming and sending queries to a group of computer systems and devices detecting the possibility of the targeted attack with the set of parameters of the group of computer systems and devices in accessing the network resource, wherein the parameters are varied at least until one parameter or set of parameters is identified that is common to the computer systems in the group for which presence of the discrepancy is confirmed; and calculating a probability of the targeted attack from the network resource based at least upon information received from the group of computer systems and devices in response to the queries.

16. The computer-readable storage medium of claim 15, wherein the multiple computer systems and devices comprise at least one of:
   user computer systems;
   trusted domain name resolution services;
   Internet service providers; and
   search systems.

17. The computer-readable storage medium of claim 15, wherein the data comprise at least one of:
   parameters of resolving responses from domain name resolution services containing information about a queried domain;
   a DNS cache time to live (TTL);
   an IP address;
   a destination URL address;
   a public key certificate; and
   a file.

18. The computer-readable storage medium of claim 15, wherein the set of parameters of each computer system or device in accessing the network resource comprises information relating to at least one of: an operating system; a communication method; an Internet service provider; a mobile operator; a client application; and a geographic region.

19. The computer-readable storage medium of claim 15, wherein the detecting discrepancies in the obtained data comprises detecting at least one of:
   a previously unknown IP address for a known resource;
   a negative change of security rating of a resource;
   a change of a DNS server and/or of a Internet provider for a known resource; and
   differences in the information obtained from a known resource through different sources.

20. The computer-readable storage medium of claim 15, further comprising instructions to cause the processor to:
   identify at least one common parameter among the set of parameters of each of the group of computer systems and devices in accessing the network resource; and
   compare the probability of the targeted attack against a selected threshold value.

\* \* \* \* \*